United States Patent [19]

Mellon

[11] 3,894,176

[45] July 8, 1975

[54] PREMIUM VIDEO DISTRIBUTION SYSTEM

[75] Inventor: Regis Benedict Mellon, St. Petersburg, Fla.

[73] Assignee: Digital Communications, Inc., St. Petersburg, Fla.

[22] Filed: Apr. 19, 1974

[21] Appl. No.: 462,581

[52] U.S. Cl. .................... 178/5.1; 325/31; 340/274

[51] Int. Cl. .............................................. H04n 1/44

[58] Field of Search ............... 178/5.1; 325/31, 308; 340/274

[56] References Cited

UNITED STATES PATENTS

| | | | |
|---|---|---|---|
| 3,387,083 | 6/1968 | Farber et al. | 178/5.1 |
| 3,694,810 | 9/1972 | Mullens et al. | 340/149 R |
| 3,733,430 | 5/1973 | Thompson et al. | 178/5.1 |

*Primary Examiner*—Maynard R. Wilbur
*Assistant Examiner*—S. C. Buczinski
*Attorney, Agent, or Firm*—Stephen B. Judlowe

[57] ABSTRACT

A video distribution system impresses an encripted premium, supplementary video program onto an MATV cable, e.g., in a hotel-motel, apartment-condominium, or like environment. Key switch enabled converters are provided at each viewing location to permit reception of the private program upon lease and insertion of the appropriate key via a conventional television receiver.

For system accounting, supervisory and verification purposes, the ensemble of converter-enabling keys are secured and retained in an array electrical key switches. The switches are electronically polled at the inception of video distribution, and a non-volatile count is made of the keys missing at that time, or removed subsequently during the program. Circuitry is provided to electronically count and store key removal (billing) events at electronic speed, while advancing a totalizer at an electromechanical rate.

10 Claims, 2 Drawing Figures

PREMIUM VIDEO DISTRIBUTION SYSTEM

This invention relates to video distribution systems and, more specifically, to a cable video system for providing private supplementary video programming on a premium, extra fee basis.

It is an object of the present invention to provide an improved premium video system especially adapted for MATV systems, e.g., hotel-motel complexes, apartment-condominum facilities, or the like.

More specifically, an object of the present invention is the provision of an encripted supplementary video distribution system requiring key actuated converter apparatus at each reception station, electronic security apparatus being provided to account for use of the converter enabling keys.

The above and other objects of the present invention are realized in a specific, illustrative MATV video distribution system wherein at least one premium video program is impressed upon a broadband coaxial cable, as in an MATV environment, in encripted form, i.e., in a manner not recoverable by a conventional television receiver. A key actuated converter is furnished at each viewing location to selectively permit reception of the premium program, for a consideration, when the appropriate key is leased.

For system supervisory, accounting, and verification purposes, electronic apparatus is provided to account for all keys during the period when the program is offered for viewing. To this end, the converter enabling keys are normally secured in electrical key switch locks, and are removed only when desired by a system subscriber (a billing event). Accordingly, at the inception of premium program distribution, the key storing switches are scanned, and the number of missing keys counted and stored. Thereafter, counted also are the keys removed from the array of lockswitches during the duration of the premium video performance(s).

In accordance with varying aspects of the present invention, key counting is effected at electronic (e.g., nanosecond-microsecond rates) to effectively eliminate miscounting upon nearly simultaneous key removal events, i.e., upon key removal at a rate exceeding electromechanical counting capabilities. Further in this regard, the cummulative key usage count is made nonvolatile, and a record is made of line power interruptions, to assure reliable and secure key monitoring.

Figure 1A:
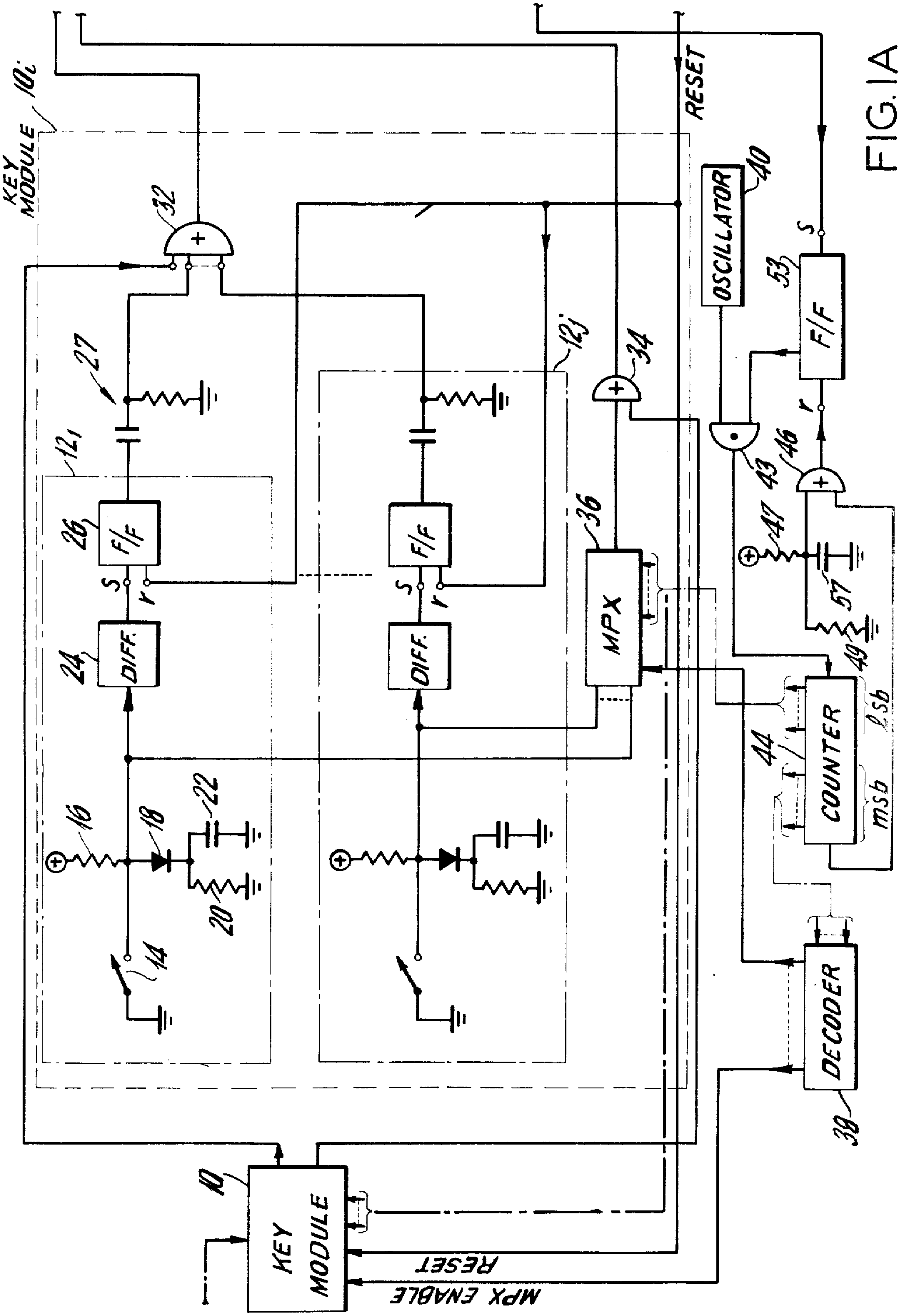
Figure 1B:
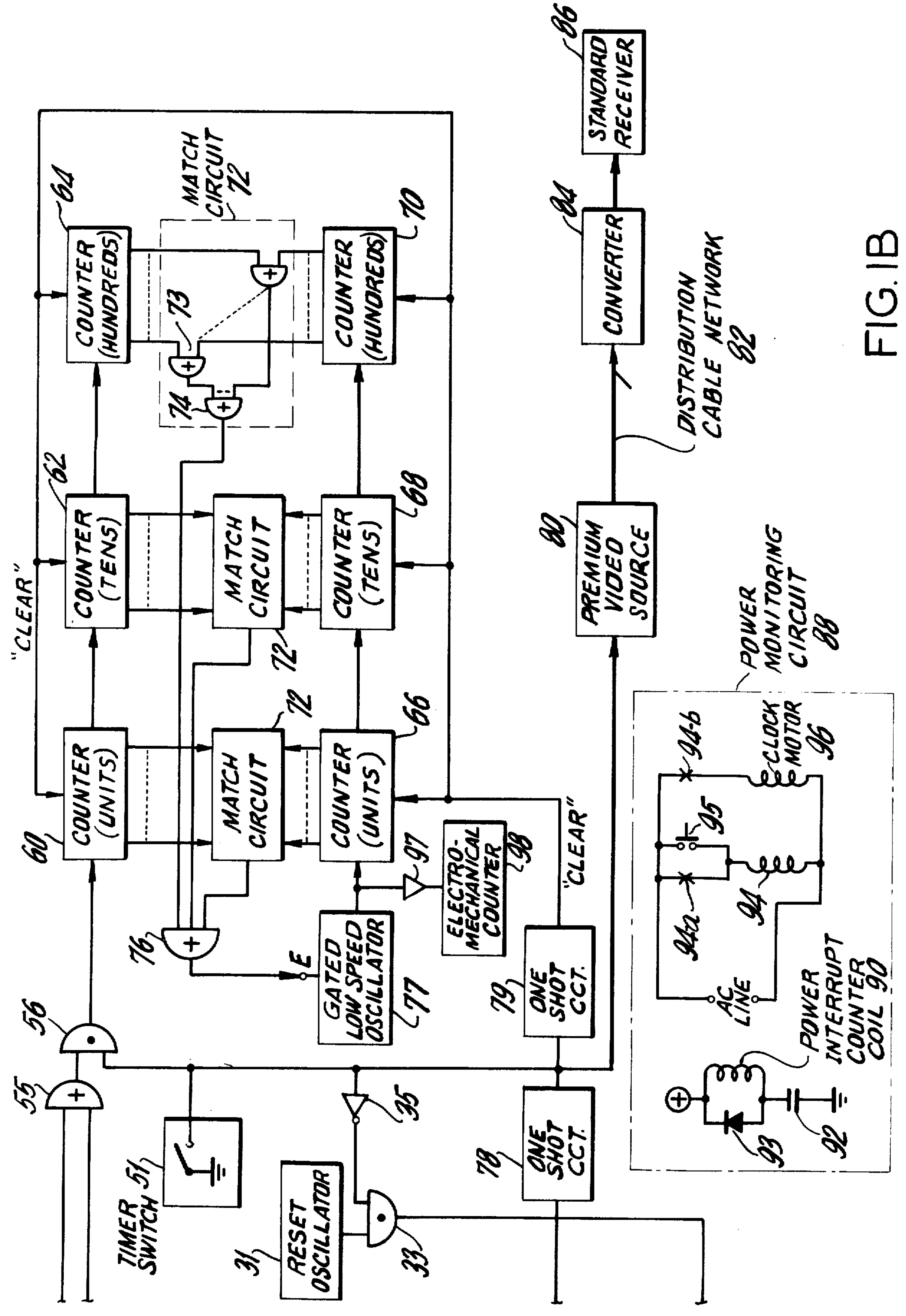

The above and other features and advantages of the present invention will become more clear for the detailed discussion below with respect to a specific illustrative embodiment thereof, presented in conjunction with the accompanying drawing, in which FIGS. 1A and 1B respectively comprise the left and right portions of a schematic block diagram depicting a video distribution key monitoring system embodying the principles of the present invention. FIGS. 1A and 1B will hereinafter be referred to as composite FIG. 1.

Referring now to the premium video signal distribution system shown in the drawing, there is included a premium video source 80 for impressing video (i.e., television) signals on a distribution network 82. The network 82 may comprise a cable in a CATV or MATV environment, most typically a hotel or motel, apartment house, condominium or the like. The premium video source, e.g., a video tape recorder followed by modulation apparatus, supplies an encripted version of the video signal to the distribution cable 82, that is, one which may not be received by a conventional television receiver connected to the cable network 82. Many embodiments for the encripted source 80 are well known to those skilled in the art, e.g., simple modulation apparatus for supplying an output video signal spectrum disposed in the frequency midband between the upper bound of commercial channel 6 and the lower bound of channel 7, which may thus not be received by standard discretely tuned standard receivers. Other forms of signal encription are similarly well known to those skilled in the art. For such premium signal distribution equipment see U.S. Pat. Nos. 3,730,980 and/or 3,733,431 the disclosures of these patents being incorporated herein by reference. Typically also, a master antenna with related head end apparatus supplies locally available commercial video on the cable 82.

Connected to the distribution cable network 82 in distinct subscriber locations, e.g., differing rooms for a hotel/motel; differing living units for an apartment or condominium; or the like are a standard television receiver 86 serially preceded by a converter 84. The converter 84 is operative to perform a signal decripting operation such that the premium signal is altered to a form proper for reception by the standard receiver 86. Thus, in one implementation, the converter 84 comprises heterodyne apparatus for shifting the midband premium signal(s) to the frequency spectrum of a standard locally unused VHF channel for reception by the receiver 86. In this manner, any sort of premium programming, e.g., first run movies, shows, sporting events or the like may be distributed over the common cable network 82 for reception only at those subscriber locations which have a reception enabling converter 84.

It is desirable in many installations to provide all subscriber room units with a basic converter 84, but to provide a key actuated electrical switch which controls converter utilization, thereby also controlling the reception of the premium video signals. Typically the converter 84 will include a by-pass radio frequency switch which permits by-passing of the converter 84 for direct connection of the standard receiver 86 to the distribution cable 82 to permit the reception of standard commercial programs present on the cable network 82. However, to receive the premium signal which requires use of the converter 84, the subscriber must obtain the key to his converter, and use that key to enable the converter. Most simply the electrical contacts of the key actuated switch on the converter 84 may control the supply of alternating current line potential to power the converter, although many other connections will be obvious to those skilled in the art for selectively enabling the converter only when the key switch is actuated. Thus, the contacts may provide a voltage (logic) level required for converter enabling; may actuate a converter subcircuit, such as by grounding a local oscillator to render the converter operable; may interrupt any input, output or intermediate connection; and so forth.

It will be appreciated that the proprietor of the video distribution system, and the supplier of the software to be shown over the video distribution system may and typically will differ from the proprietor of the hotel or apartments in which the premium video distribution service is provided. Accordingly, it is desirable for absentee management control purposes that the use of the converter actuating keys be monitored so that all concerned may derive their proper proportionate share of the revenues generated by the system. To this end, the remainder of the FIG. 1 system comprises a system arrangement for monitoring the number of keys in service during a period in which the premium video is being distributed, and to monitor the key counting apparatus itself to assure that the equipment remains powered and operative.

By way of general overview, a converter key retaining console panel (not shown) is employed at some central point in the subject environment, e.g., at the desk location in a hotel or motel. On this panel there is included a plurality of key-lock electrical switches in one-to-one correspondence with the number of converters 84 in service. When a subscriber has not obtained a key to permit viewing the evening premium movie or the like in a hotel/motel, the key is secured in the associated lock in the console. Thus, just before the beginning of the feature program, the console contains all keys which have not been leased by subscribers.

At the beginning of the feature presentation, the key containing lock switches at the central console are electronically scanned and the number of missing keys totalized. Further, if at any time during the movie a key is removed, the accumulated count is further incremented. Thus, at the end of the movie the totalizer has stored therein the number of keys which were presold before the movie began, and the number of keys sold during the program showing period (which may correspond to a number of successive runs of the same or different presentations). Thus, the totalizer contains a direct count of the number of subscribers viewing the film in a manner which is secure for the benefit of those not controlling the premises, but who provide the video distribution equipment and/or the software to be shown thereover. In accordance with varying additional aspects of the present invention, power monitoring circuitry 88 is provided to indicate conditions where power is removed from the key counting and monitoring equipment as further measure of protection for the video distribution and software providing entities.

With the above overview in mind, the specific key usage monitoring equipment of composite FIG. 1 will now be described. There are included a number of key modules 10 each of which include a plurality of individual key lock monitoring circuits 12. One key module $\mathbf{10}_i$ is shown in detail in the drawing, one key lock monitoring circuit $\mathbf{12}_1$ also being shown in detail.

Examining the key, key lock associated circuitry $\mathbf{12}_1$ of the module $\mathbf{10}_i$ shown in FIG. 1A, this being representative of all other such equipment, there is included the key containing lock switch contacts 14 which are normally open when the key is secured therein (when no billing is to be effected), one switch contact being grounded (it is assumed here that current sinking logic is employed, ground thus being a binary (zero) level). With the key secured in its retaining lock, a capacitor 22 is charged to a high level by a resistor 16 and a diode 18. The input to a differentiator 24 is thus high while the key is in place. When the key is sold to a subscriber and thus removed, the contacts 14 close to immediately ground the logic point at the node of the resistor 16 and diode 18. The diode 18 becomes reverse biased and the charged capacitor 22 discharges through a shunt connected resistor 20. This negative voltage transition from a high logic level to a low level is differentiated in the differentiator 24, which sets a memory flip-flop 26. The resulting voltage transition at one output of the flip-flop 26 is a.c. coupled by coupling network-differentiator 27, the resulting pulse passing through an OR gate 32 to an output of the module $\mathbf{10}_i$. Each pulse at the output of the OR gate 32 thus signifies that a key has been sold.

The output of the several key modules 10 are cascaded by simply providing a cascade input to the OR gate 32 at each module 10, one such inter-module cascade connection being shown for the modules $\mathbf{10}_i$ and 10 to the left thereof. Thus, each output pulse of the gate 32, coupled to an OR gate 55 of the common control circuitry of FIG. 1B, represents a key removal, and thus a billing event. More specifically, the circuitry above described monitors the removal of keys during the actual showing of a premium program once the program distribution period has begun. Additional circuitry described immediately below monitors (i.e., scans all of the key locks 14 at the beginning of the movie (or other premium programming) to determine the number of keys which had already been sold prior to premium program inception.

It will be appreciated that the junction point between the resistor 16 and the diode 18 for each key lock circuit 12 directly represents a logic signal measure of whether or not the key has been sold. That is, the level is high if the key is in place (contacts 14 open) or is at a low, grounded level if the key has been sold (contacts 14 closed). The logic levels associated with each of the keys is connected as an input to a multiplexer 36 in each module 10, this information being sequentially gated out under control of a multiplexer-actuating counter 44 which is supplied in common to the multiplexer 36 of each module, and responsive to the output of a decoder 38 which enables the multiplexer 36 of only one module 10 at a time. The decoder 38 is driven by the most significant output digits of a counter 34, the lesser significant bits of the counter cycling all of the multiplexers 36 in common.

The output of each multiplexer 36 is combined in an OR gate 34 in a module 10 with the cumulative multiplexer output of all preceding cascaded modules 10. The output of the OR gate 34 of the final module 10 (the module $\mathbf{10}_i$ in FIG. 1) is connected as a second input to the OR gate 55. Actuation of the multiplexer 36 via the counter 34 and the decoder 38 to converge the information persisting at the inputs of the multiplexer 36 is well known to those skilled in the art — indeed commonly available integrated logic circuits for this purpose are both available and widely employed.

The output of the OR gate 34 of the final module $\mathbf{10}_i$ thus in general comprises a selective synchronous sequence of pulses corresponding in number to the number of keys which are not present in the total ensemble of key switches 14 at the beginning of premium program distribution. In particular, each of the key retaining switches 14 is sequentially addressed by the counter-decoder 44–38 at the beginning of movie distribution, as signalled by the system timer switch 51 setting a flip-flop 53 via a one shot circuit 78. When the key of a particular address is still in the lock 14 no pulse is generated; correspondingly, when the key is not in the lock a pulse is generated at polling, and passes through the converging OR gates 34 of the cascaded modules 10 finally flowing out of the OR gate 34 of the module $\mathbf{10}_i$ to the OR gate 55. Thus, the lower input of the OR gate 55 developed at the inception of premium program distribution comprises a number of pulses corresponding to the number of keys sold during the entire period, typically almost a full day, before premium program distribution commences.

This key scanning at the very beginning of movie signal distribution occurs at a relatively rapid rate, e.g., 10KHz, corresponding to the cyclic output of an oscillator 40. At the beginning of premium program distribution (signalled by the output of timer switch 58), the flip-flop 55 is set via the one shot circuit 78. This enables an AND gate 42, passing the output of the oscillator 40 to the count input of the counter 44. In the manner above discussed, the counter 44 and decoder 38 respond to the ensuing sequence of oscillator 40 output pulses by addressing all of the key switch locks 14 in turn, thereby interrogating the state of each. When all addresses have been generated, signalled by an overflow digit from the final counter 44 stage, this overflow digit resets the flip-flop 53 via an OR gate 46. The reset flip-flop 53 disables the gate 42, which thus remains disabled until the next performance. Thus, the ensemble of key switches 14 are addressed only once.

To assure that the flip-flop 53 comes up in a reset condition when power is applied or reapplied to the system, a capacitor 57 (a logical zero for a current sinking logic when discharged) applies a reset load pulse to the flip-flop 53 reset terminal via the OR gate 46 when power is initially applied. The capacitor 57 charges through a resistor 47 (really the combination of the resistors 47 and 49) to rise to the 1 level, to thereafter no longer effect the circuitry as long as power is continuously applied thereto. Resistor 49 in parallel with the capacitor 57 is utilized to discharge the capacitor to the binary zero level when power is removed from the circuit.

A reset oscillator 31 supplies output pulses at a relatively low rate, e.g., one pulse every 18 seconds, to periodically reset the flip-flops 26 in the lock switch monitoring circuits 12 via an AND gate 33. The AND gate 33 is enabled to pass reset pulses from the source 31 to the flip-flops 26 during times other than when the premium programming is being distributed, as signalled by the output of an inverter 35 connected to the output of the master timer switch 51. The reset flip-flops 26 thus assure that a key removal signaling pulse will be generated when a key is removed during a period of interest, e.g., during the active show time interval.

The structure and procedure by which the system billing events (i.e., key removals) are processed and counted will now be discussed. It will be recalled that the gate 55 of FIG. 1B has two inputs, the upper being an asynchronous pulse train wherein a pulse is generated, during the period when the premium program is being distributed only, when any key is removed from the key switch rack. Correspondingly, the lower input to the OR gate 55 comprises a pulse train, synchronous in form but having pulses selectively present and deleted at the prescribed periodic times. These pulses at the lower input to the OR gate 55 selectively occur at the rate of the oscillator 40, and take place when the key rack is scanned, e.g., about the beginning time of the premium program distribution. Thus, a pulse at either input of the gate 55 indicates that a single key has been removed and, more to the point, that the holder thereof is presumably watching the premium program. Accordingly, a billing indication or count must be developed responsive to each such pulse.

An AND gate 56 is enabled by the output of the timer switch 51 (assumed to be at a high voltage (i.e., open current) level during premium program distribution). Most simply, the timer switch may comprise a clock motor driven, cam actuated contact pair well known to those skilled in the art. Accordingly, when the AND gate 56 is enabled during program distribution, all pulses reaching the OR gate 55 through either input lead thereto pass through the enabled AND gate 56 to the input of a counter stage 60.

A first counter is formed of cascaded counter modules 60, 62 and 64, the modules increasing in significance in the order listed. Thus, for example, the counter modules 60, 62 and 64 may be decade counters where the respective modules correspond to units, tens and hundreds in their respective significance. In a straightforward conventional manner, the number of pulses passing through the gates 55 and 56 cycle and are represented by the state of the composite counter 60-62-64. The counter module 60-62-64 may comprise, for example, well known integrated modules therefor, and thus the composite counter 60-62-64 may be advanced at the electronic rates on the order of nanoseconds. Thus, no matter how rapidly one attempts to remove keys from the key rack, each separate pulse generated thereby will be very easily counted by the electronic structure. As a matter of experience, it is essentially impossible to remove two keys simultaneously even were this attempted, since the actual switch 14 closures (and their approval time at the counter) would not occur in exact overlapping time coincidence, where each contact closure is converted to a nanosecond-microsecond range pulses by the associated differentiator 27.

The result to be achieved by the composite counter apparatus of FIG. 1B is to advance an electromechanical counter 98 to reflect the number of movies (i.e., keys) sold. The electromechanical counter may be of any type well known to those skilled in the art, e.g., of the solenoid actuated ratchet and pawl type. Characteristically, such counters 98 must be advanced relatively slowly, only several times a second. Accordingly, the counter 98 may not be directly advanced by the pulses supplied to the OR gate 55 — such a counter would never be able to track either rapid scanning of the keys, or the attempted rapid removal of keys from the key rack.

To advance the slow counter 98 to reflect the number of pulses supplied to the OR gate 55 a second counter 66-68-70 is employed, this counter being substantially identical to the composite counter 60-62-64 described above. At the beginning of the counting cycle, both counters 60-62-64 and 66-68-70 begin at the same state — either that obtaining following the last premium signal cycle or, preferably, a cleared state as implemented responsive to a clear output pulse from a one shot circuit 79 responsive to the beginning of the movie distribution period.

A plurality of match circuits 72 have their inputs connected to corresponding ones of the counter stages 64–70, 62–68, and 60–62, each circuit 72 being adapted to supply an output if and only if the states of the counter modules associated therewith are not the same. Thus, each match circuit 72 may include a plurality of Exclusive OR gates 73 in one-to-one correspondence with the stages of the counters associated therewith, and an OR gate 74 connected to the outputs of the Exclusive OR gates 73. As is well known, an Exclusive OR gate 73 will provide a high level output only if the Boolean inputs thereto differ to signify that there is no identity between the counter modules connected thereto. The outputs of the three matched circuits 72 are supplied as inputs to a master OR gate 76 which thus provides an output only if there is no identity between the composite counters 60-62-64 and 66-68-70. When there is no identity, i.e., when the output of the OR gate 76 is high, a gated low speed oscillator 77 is enabled and the oscillator supplies pulses at a rate compatible with the counting speed of the counter 98, e.g., three pulses per second. Correspondingly, when a match obtains between the two composite counters, the output of the OR gate 76 is low and the oscillator 77 is disabled.

By way of overall operation, then, pulses load the counter 60-62-64 at electronic speed, the counter 60-62-64 thus containing a count which exceeds that of the counter 66-68-70. Accordingly, the previously obtaining match between the two counters is obviated, and the oscillator 77 is enabled. Accordingly, the oscillator 77 supplies output pulses at its characteristic slow rate to the counter 66 such that the composite counter 66-68-70 tracks the counter 60-62-64. When the counter 66-68-70 "catches up" to the state of the counter 60-62-64, the match circuits 72 disable the oscillator 77. When and if further pulses are loaded into the counter 60-62-64, the above circuit action repeats so that additional pulses are loaded as well into the slave counter 66-68-70. Thus, each output pulse from the gated low speed oscillator 77 corresponds to a pulse at the output of the OR gate 55 (i.e., corresponds to a billing event), but where the pulses at the output of the oscillator 77 occur at a much slower rate of speed.

As a further matter, the counter 98 is connected to the output of the oscillator 77 via a buffer-driver amplifier 97. The counter 98 is thus advanced to store therein the number of billing event pulses developed at the output of the OR gate 55. The electromechanical counter 98 comprises a non-volatile memory and is available for reading by the hardware-ssoftware proprietors to verify the number of keys sold by the hotel/motel proprietor or the like.

As further system monitoring parameters, an additional electromechanical counter having a counter coil 90 is employed to monitor the number of power interruptions experienced by the composite FIG. 1 system. This prevents defeating the FIG. 1 monitoring apparatus by removing line power to prevent advancing of the counter 98. The counter coil 90 is connected between one of the system power supplies and ground through a capacitor 92, and is thus energized once for every power turn on cycle as the capacitor 92 becomes charged. A diode 93 is employed for inductive transient suppression, and to discharge the capacitor 92.

As a further power interruption control, a clock motor 96 is driven by a relay 94 which includes normally open relay contacts **94-*a* connected in a relay latching mode. When power is initially applied to the system, a contact pair 95 of restricted access is manually closed thereby passing current through the relay coil 94 and closing the contacts 94-*a* to hold the relay conductive after the contacts 95 are released. This also closes a relay contact pair 94-*b* to energize a clock motor 96 which advances a date-time clock. Should a.c. line power ever be removed from the circuit, the relay 94 will become de-energized, and will not be reactivated when a.c. line power reappears. Accordingly, the contacts 94-*b* will remain open circuited, thus not activating the clock motor 96. Thus, the time date clock will remain set to the date and time of the first power interruption. Accordingly, the composite power monitoring circuit 88 of FIG. 1** will present information to the hardware-software proprietors regarding both the number of power interruptions and the date of the first such interruption.

The above described arrangement thus comprises a secure, efficient and reliable system for providing management controls over a premium video distribution system. The arrangement is merely illustrative of the principles of the present invention. Numerous modifications and adaptations thereof will be readily apparent to those skilled in the art without departing from the spirit and scope of the present invention. Thus, for example, any form of logic structure may be employed to implement the logic functions above described. Also, video distribution may or may not be synchronized with separation of the timer switch 51 in FIG. 1.

What is claimed is:

1. In combination in a key monitoring system, a plurality of key securing lock switches, each having electrical contacts exhibiting a closed or open state depending upon the presence of an associated key thereon, lock switch contact monitoring means connected to said lock switch contacts for supplying an output pulse when a key is removed from any of said lock switches, multiplex means having plural inputs connected to said lock switch electrical contact monitoring means, addressing means connected to said multiplex means for serially gating onto a multiplexed output port the state of said plural lock switch electrical contacts, disjunctive logic means for providing an output responsive to an output of either said key removal pulse supplying means or an output of said multiplexing means, and key counting means for counting the outputs of said disjunctive logic means.

2. A combination as in claim 1, wherein said key counting means comprises first counter means connected to the output of said disjunctive logic means, second counter means, match circuit means connected to said first and second counter means for providing an output signal indicating whether or not a match obtains between the states of said first and second counter means, and relatively low speed oscillator means responsive to the output of said match circuit means for arbitrarily supplying output pulses to said second counter means.

3. A combination as in claim 2, further comprising electromechanical counter means connected to the output of said low speed oscillator means.

4. A combination as in claim 2, wherein said match circuit means comprises Exclusive OR type logic means.

5. A combination as in claim 1, wherein said key removal pulse supplying means comprises plural differentiator means, each connected to a different one of said lock switch contacts.

6. A combination as in claim 1, further comprising video source means, a signal distribution cable, and plural subscriber stations connected to said distribution cable, said subscriber locations comprising a standard television receiver and a converter connected intermediate said distribution cable and said receiver, said converter including a key actuated electrical switch for selectively enabling said converter, associated ones of said lock switches and said converters including means for responding to a like key.

7. A combination as in claim 1, further comprising means for monitoring the number of line power interruptions.

8. A combination as in claim 1, further comprising a time-date electrical clock, and latching relay means for selectively energizing said electrical time-date clock.

9. A combination as in claim 1, wherein said electrical contacts of said key securing lock switches are normally open when the associated key is secured therein, wherein one terminal of said contacts is grounded, and further comprising a voltage source, a resistor connected between said voltage source and the other of said lock switch contact terminals, and serially connected diode and capacitor means connecting said other contact terminal to ground.

10. A combination as in claim 1, wherein said key removal pulse supplying means includes plural flip-flops, each connected to different lock switch contacts, each flip-flop being set when the associated key is removed, plural pulse generating means, each producing an output pulse responsive to an associated flip-flop changing state, and means for interconnecting the outputs of said pulse generating means.

* * * * *